United States Patent [19]

Cronk

[11] Patent Number: 4,538,837
[45] Date of Patent: Sep. 3, 1985

[54] ANTI-CORROSION PIPE APPARATUS

[76] Inventor: Allan D. Cronk, 950 Greenwood Rd., West Vancouver, British Columbia, Canada

[21] Appl. No.: 428,479

[22] Filed: Sep. 29, 1982

[51] Int. Cl.³ .............................................. F16L 21/00
[52] U.S. Cl. ...................................... 285/55; 285/173; 285/236; 285/331; 285/398
[58] Field of Search ............... 285/236, 398, 173, 177, 285/331, 55, 109, 371

[56] References Cited

U.S. PATENT DOCUMENTS

| | | | |
|---|---|---|---|
| 1,628,302 | 5/1927 | Bray | 285/236 |
| 2,284,761 | 6/1942 | Nathan | 285/55 X |
| 2,470,359 | 5/1949 | McLean | 285/398 X |
| 3,233,907 | 2/1966 | Stanton | 285/177 X |
| 3,479,066 | 11/1969 | Gittleman | 285/236 |
| 3,512,805 | 5/1970 | Glatz | 285/109 |
| 3,563,573 | 2/1971 | Crompton | 285/55 |
| 3,686,747 | 8/1972 | Bagnulo | 285/371 X |
| 3,796,057 | 3/1974 | Dougherty | 285/331 X |
| 3,828,823 | 8/1974 | Douglas | 285/55 X |
| 4,119,334 | 10/1978 | Steed | 285/236 |
| 4,191,407 | 3/1980 | Bretone, Jr. | 285/177 X |
| 4,221,407 | 9/1980 | Steimle | 285/236 |
| 4,269,437 | 5/1981 | Shaw et al. | 285/398 X |

FOREIGN PATENT DOCUMENTS

| | | | |
|---|---|---|---|
| 719613 | 10/1965 | Canada | 285/331 |
| 580775 | 7/1933 | Fed. Rep. of Germany | 285/371 |
| 23412 | 8/1897 | United Kingdom | 285/55 |
| 768326 | 2/1957 | United Kingdom | 285/236 |
| 1434490 | 5/1976 | United Kingdom | 285/398 |

Primary Examiner—Thomas F. Callaghan
Attorney, Agent, or Firm—Fetherstonhaugh & Co.

[57] ABSTRACT

An aluminum alloy pipe having a non-corrosible lining coating the interior surface thereof, and an annular sleeve formed of non-corrosible material to fit over and grip an end of the pipe, this sleeve being shaped to cover the end of the material forming the pipe and overlapping and gripping both the interior lining and the outer surface of the pipe. This sleeve fitted on the pipe end will fit within a standard pipe coupling to be gripped thereby.

5 Claims, 6 Drawing Figures

U.S. Patent  Sep. 3, 1985  4,538,837
PRIOR ART
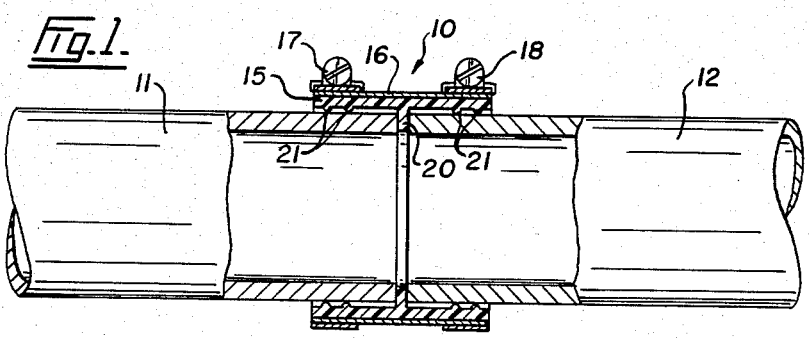
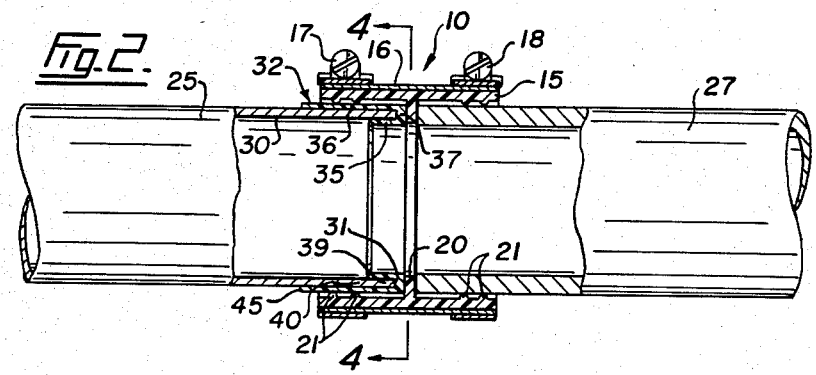
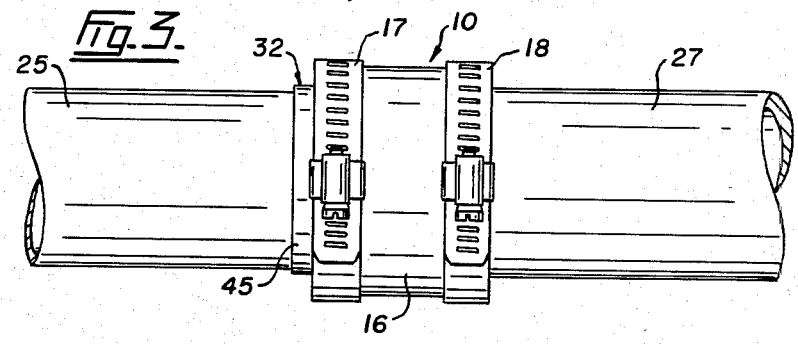
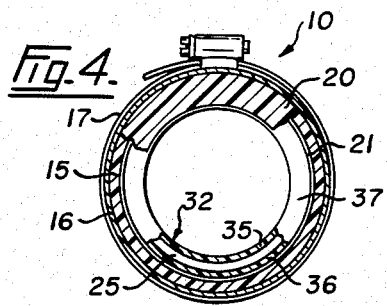
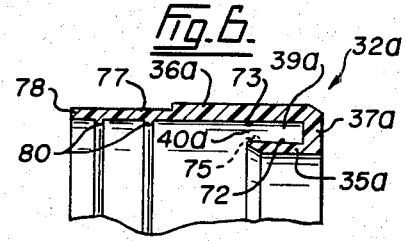
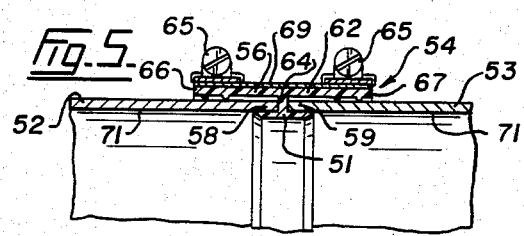

ANTI-CORROSION PIPE APPARATUS

This in invention relates to anti-corrosion pipe apparatus primarily for the soil pipe field, which can be used in other fields as well.

This pipe apparatus includes pipes and pipe fittings, such as elbows, tees, and the like, and the term "pipe" as used herein and in the claims is intended to include such fittings.

As this apparatus is primarily intended for use in the soil pipe field, it will be described herein relative to soil pipes, but it is to be understood that the apparatus may be used anywhere where pipes and allied fittings are required.

Soil pipe carries the sewage from baths, water-closets, sinks and lavatories to underground sewer systems. At present, the accepted materials for these pipes are: cast iron, copper, asbestoes cement, ABS plastic, and PVC plastic. Cast iron soil pipes are connected to each other and to cast iron fittings, such as wyes, bends, reducers, and the like, by standard neoprene and stainless steel couplings. One of the most common material used is cast iron which is a satisfactory material for this purpose, but it presents problems in manufacture and installation. Some of these problems are as follows:

(a) Because the pipe must be pulled from a steel mould, a taper is built in, and the outside diameter must vary by approximately 1/16 inch from end to end.

(b) The inside diameter is difficult to control and may vary greatly from one end to the other, resulting in thick and thin cross sections.

(c) The internal surface is very rough, thus interfering with the fluid flow.

(d) Impurities in the iron may cause porous castings, resulting in leaks during pressure tests on site.

(e) Iron pipe is very heavy. This presents problems in getting the product on the job site, and difficulty in installation.

(f) It is difficult to cut.

(g) It is brittle and is easily broken in handling and during cutting operations.

(h) The large allowable tolerance on the outside diameter ($\pm$ 1/16) makes it difficult to make leak-proof joints even with the very flexible coupling used.

While aluminum pipe will overcome all of the above difficulties, it has not been used since it is actively attacked by chemicals such as sodium hydroxide, which is the major ingredient in most drain cleaning compounds. As a result, the heavy cast iron pipe with its attendant problems is generally in use.

The apparatus of the present invention eliminates these problems. This apparatus includes aluminum alloy pipe which preferably has a non-corrosible lining coating applied thereto. The apparatus also includes an annular sleeve formed of non-corrosible material to fit over and grip an end of the pipe, this sleeve is shaped to cover the end of the material forming the pipe and overlaps and grips both the interior lining and the outer surface of the pipe. A standard coupling can be used to connect this pipe to another pipe or fitting. The latter pipe or fitting can have the same diameter as the first-mentioned pipe, or it may be a standard cast iron pipe or fitting. The annular sleeve is made so that the portion thereof covering the outer surface of the pipe end is thick enough to fill the space between the pipe and the standard coupling.

Various forms of anti-corrosion pipe apparatus in accordance with this invention are illustrated in the accompanying drawings, in which:

FIG. 1 is a longitudinal section through a standard coupling connecting two standard cast iron pipes, FIG. 2 is a longitudinal section through a pipe and annular sleeve according to this invention, connected to a standard pipe by a standard coupling, FIG. 3 is a plan view of the apparatus of FIG. 2, FIG. 4 is a vertical section taken on the line 4—4 of FIG. 2, FIG. 5 is a fragmentary longitudinal section through an alternative form of this pipe apparatus, and FIG. 6 is a fragmentary longitudinal section through another form of an annular sleeve forming part of this invention.

Referring to FIG. 1 of the drawings, 10 is a standard coupling interconnecting axially aligned standard cast iron pipes or fittings 11 and 12. The coupling consists of a sleeve gasket 15 formed of neoprene or other suitable material, a stainless steel shield 16 surrounding the gasket, and a pair of clamps 17 and 18 which surround the shield and gasket and are tightened to cause the ends of the gasket to grip the two pipes. The gasket is formed with an inwardly-projecting flange 20 that extends between the ends of the two pipes, and with internal ribs 21 on its inner surface near the ends thereof. These ribs are located beneath the clamps 17 and 18.

Examples of the present invention are illustrated in FIGS. 2 to 6 of the drawings. FIGS. 2, 3 and 4 show the standard coupling 10 interconnecting an aluminum pipe or fitting 25 with a standard cast iron pipe 27. The pipe 25 forms part of this invention.

The aluminum pipe 25 is provided with a non-corrosible lining coating 30. As soil pipes have to be cut into different lengths in situ, it serves no useful purpose to coat the end 31 of the pipe during manufacture. The inner coating 30 may be formed of any suitable material that will adhere to the aluminum alloy of the pipe, and which resists corrosion by sewage materials, sodium hydroxide and the like. Coal tar epoxy resin has been found very satisfactory for this purpose.

In order to provide protection for the end of pipe 25, an annular sleeve 32 is provided, this sleeve is formed of a non-corrosible material, and a suitable plastic, polymeric or elastomeric material is used. Neoprene has been found satisfactory for this purpose.

The sleeve 32 comprises concentric and radially spaced inner and outer bands 35 and 36 joined at adjacent edges thereof by an annular web 37. These bands and the web form an annular pocket 39 having an entrance 40 facing away from the web. The sleeve bands and the pockets formed therebetween are shaped and sized to receive the end 31 of pipe 25. Although not absolutely necessary, a suitable mastic may be inserted into the pocket 39 before the pipe end is inserted thereinto. The outer band 36 is preferably wider than the inner band 35, as shown, and the outer and inner bands overlap and grip the outer surface of the pipe and the inner lining, respectively. This annular sleeve prevents the contents flowing through pipes 25 and 27 from coming into contact with the pipe end and the outer surface of a pipe at said end. The inner band 35 of the sleeve overlaps the non-corrosive lining 30 and firmly grips the latter so as to prevent any liquid from getting between the annular sleeve and the pipe.

It will be noted that the wall of the aluminum pipe 25 is considerably thinner than the wall of the cast iron pipe 27, and that the outer diameter of the aluminum pipe is less than that of the cast iron pipe. The outer band 36 of sleeve 32 is made sufficiently thick to fill the space between pipe 25 and the sleeve gasket 15 of coupling 10. In other words, the outer diameter of the sleeve is substantially the same as the outer diameter of pipe 27. It will also be noted that the outer band 36 is made of such width that its outer edge 45 extends outwardly beyond adjacent edge of gasket 15. This makes it possible properly to apply coupling 10 to the two pipes. In the event of the coupling being applied to aluminium pipe 25 without sleeve 32 installed thereon, it will readily be seen during inspection that the sleeve is not present.

When a pipe joint is to be made, the end of pipe 25 is inserted into an end of the annular sleeve gasket 32. The pipe end with the sleeve is inserted into the gasket 15 of coupling 10. The sleeve 32 fits in the gasket and fills the space between the latter and the pipe. Then pipe 27 is fitted into the opposite end of the coupling gasket. When the clamps 17 and 18 are tightened, a liquid-tight joint is formed.

The lining coating 30 and the annular sleeve 32 make it possible to use aluminum pipe and fittings in soil pipe systems. The dimensions of the sleeve make it possible to use standard couplings to interconnect aluminum pipe to standard cast iron pipes or fittings and to interconnect two aluminum pipes or fittings. Any suitable aluminum or alloy may be used. The preferred pipe is made of an aluminum alloy base with an aluminum alloy (high zinc) internal cladding. This type of pipe is normally used for irrigation and gas piping where the zinc rich alloy lining gives additional service life which is approximately 10 times the life of unclad aluminum alloy pipe.

FIG. 5 illustrates a variation of the present invention. Two axially aligned aluminum pipes or fittings 52 and 53 are interconnected by a coupling 54 incorporating the present invention. This coupling eliminates the necessity of sleeve gasket 15 of the standard coupling 10.

Coupling 54 includes an annular sleeve 56 formed of non-ccorrosible material. This sleeve is double-ended so that the two pipes or fittings extend into the sleeve and into pockets 58 and 59 formed therein by a common inner band 51 and a common outer band 62. The inner band is connected to the outer band by an annular web 64 which is located substantially midway between the outer edges 66 and 67 of the outer band 62. Standard clamps 65 may be directly applied to the outer surface of coupling 54 adjacent the end edges 66 and 67 thereof, but it is preferable to provide a stainless steel shield 69 over the outer surface of sleeve 56 and beneath the two clamps. The pipes 52 and 53 are the same as pipe 25 described above, and have the non-corrosible lining 71. Actually, sleeve 56 is two annular sleeves formed in one to receive the ends of pipes 52 and 53. The inner band 51 overlaps and grips the inner lining 71 of the two pipes, while the outer band 62 overlaps and grips the outer surfaces of the pipes at their adjacent ends.

FIG. 6 illustrates an alternative form of annular sleeve 32a similar to sleeve 32 of FIG. 2. Sleeve 32a is made up of inner and outer bands 35a and 36a interconnected by a web 37a. These elements form a pocket 39a for receiving the ends of a pipe or fitting. The entrance 40a of pocket 39a is narrower in cross section than the remainder of the pocket. This ensure a very tight grip on the end of the pipe fitted in the pocket. In this example, the restricted entrance is formed by inclining the inner surface 72 of inner band 35a towards the inner surface 73 of outer band 36a in the direction of the pocket entrance 40a. As an alternative to this, the inner surface 72 of the inner band may be formed with a bead 75, shown in dotted lines in FIG. 6.

If desired, the outer surface of band 36a may be formed with a groove or annular recess 77 therein at the edge 78 thereof remote from web 37a. This groove or recess is approximately the size of a clamp 65. When sleeve 36a on a pipe end is inserted into a coupling 10, the tightening of clamp 65 presses the adjacent end of coupling shield 16 down into the groove 77. This arrangement further reduces the possibility of the pipe joint coming apart under pressure. In addition to groove 77, the inner surface of band 36a may be formed with one or more annular beads or ribs 80 to improve the grip of the sleeve 32a on the outer surface of the pipe and to minimize the possibility of leakage.

While the sleeve illustrated in FIG. 6 is a single sleeve, it is to be understood that the features of sleeve 32a can be incorporated in a double-ended sleeve such as sleeve 56 of FIG. 5.

While this invention has been described above in connection with an aluminum pipe having a lining 30, it is to be understood that this sleeve arrangement can be used on pipes without this lining, in which case the sleeve 32 can protect the cut ends of pipes from corrosion.

I claim:

1. A pipe assembly, comprising:
   (a) first and second coaxial interconnected pipe portions having inner and outer peripheral surfaces and said second pipe portion having an end portion with a wall thickness exceeding the wall thickness of the corresponding end portion of said first pipe portion;
   (b) a non-corrosible lining coating said inner peripheral surface of at least said first pipe portion;
   (c) an annular sleeve fitted over and gripped to a first end portion of said first pipe portion, said sleeve comprised of a non-corrosible resilient material;
   (d) said sleeve comprising concentric radially spaced inner and outer bands joined at adjacent edges thereof by an annular web and thereby forming an annular pocket having an entrance opening away from said web and adapted for receiving said first end portion so that the end thereof seats on said web;
   (e) said inner band contiguously disposed for the length thereof in engagement with the radially inner surface of said lining and with said outer band contiguously disposed for the length thereof in engagement with said outer peripheral surface so that fluid flowing through said first pipe portion is prevented from engaging said first end portion;
   (f) said outer band extends longitudinally from said web a distance exceeding the distance said inner band extends and said outer band having sufficient thickness so that the outer surface thereof is of an outer diameter substantially equal to the diameter of said outer peripheral surface of said second pipe portion;
   (g) an axially extending recess of substantial length disposed in the outer surface of said outer band proximate the end thereof opposite said web;
   (h) a gasket sealingly engaged with the outer surface of said outer band and with said outer peripheral surface of said second pipe portion, said gasket having a radially inwardly extending flange engaged with said web and with the corresponding end portion of said second pipe portion for preventing fluid leakage from between said pipe portions when interconnected;
(i) a shield exteriorly surrounding said gasket; and,
(j) first and second clamp means circumferentially disposed about said sleeve and sufficiently tightened to cause said gasket to grip and thereby engage the outer surface of said outer band and said second pipe portion outer peripheral surface;
(k) said first clamp means aligned with said recess and sufficiently tightened to cause the underlying gasket and shield to press into said recesses and thereby prevent said pipe portions from becoming uncoupled.

2. The assembly as defined in claim 1, wherein:
(a) said lining is a coal tar epoxy resin.

3. The assembly as defined in claim 1, wherein:
(a) said resilient material includes a polymeric material.

4. The assembly as defined in claim 1, wherein:
(a) said resilient material is neoprene.

5. The assembly as defined in claim 1, wherein:
(a) said annular pocket being narrower in cross section at the entrance thereof than at said web.

* * * * *